Sept. 10, 1963 A. PERRI 3,103,290
MULTIPLE PURPOSE AUTO CARRIER AND DUMP BOX
Filed May 8, 1961 2 Sheets-Sheet 1
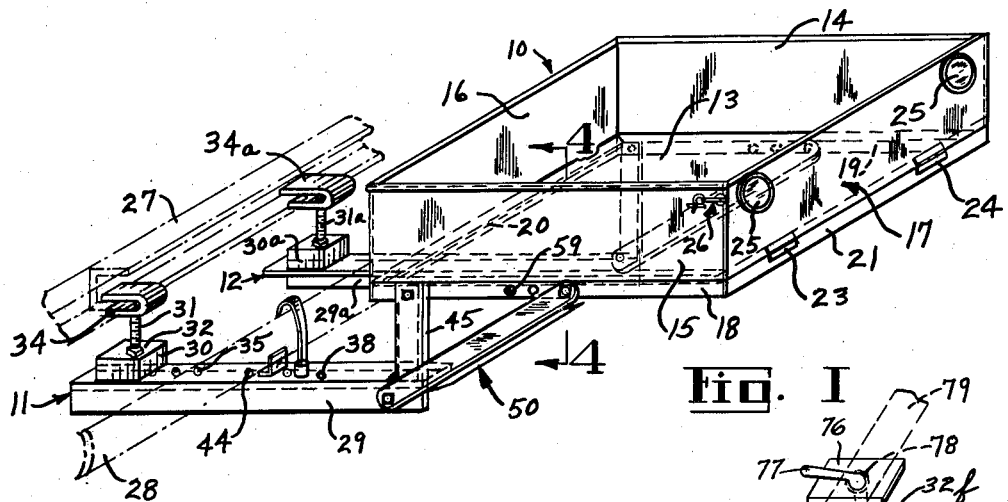
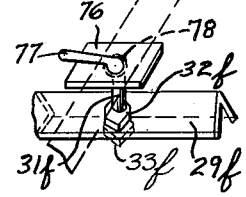
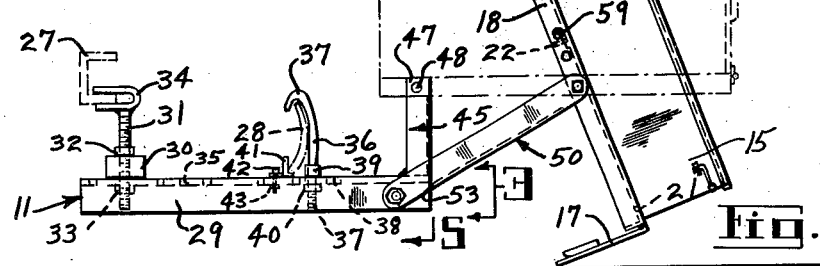
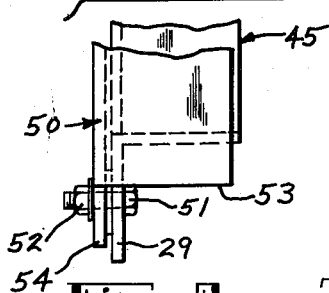
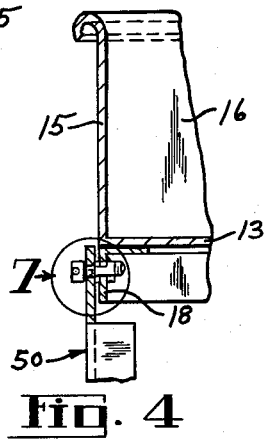
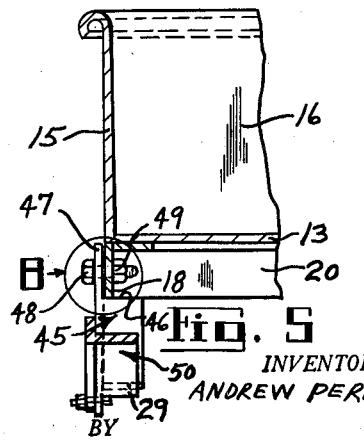
INVENTOR.
ANDREW PERRI
BY
Donnelly, Meentag & Harrington
ATTORNEYS

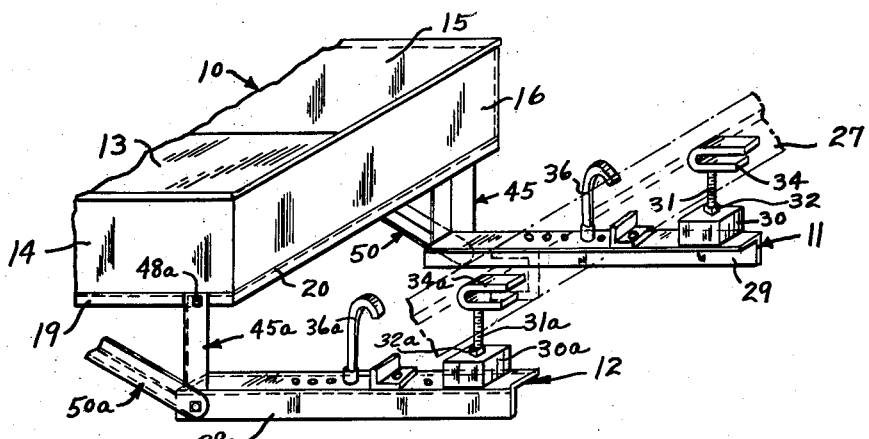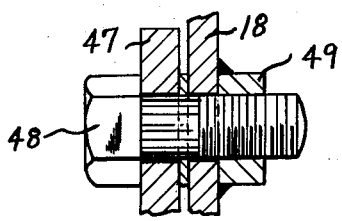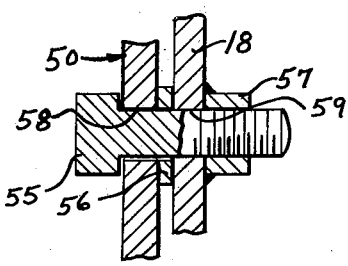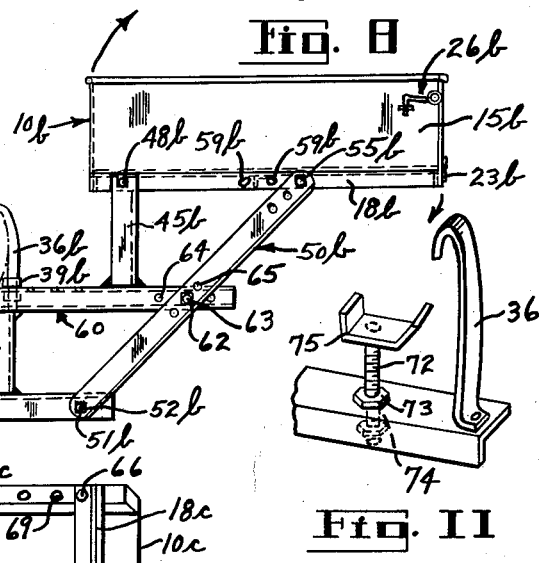
INVENTOR.
ANDREW PERRI

United States Patent Office 3,103,290
Patented Sept. 10, 1963

3,103,290
MULTIPLE PURPOSE AUTO CARRIER AND
DUMP BOX
Andrew Perri, 25597 Fern, Roseville, Mich.
Filed May 8, 1961, Ser. No. 108,675
5 Claims. (Cl. 214—450)

This invention relates to an improved detachable multiple purpose auto carrier and dump box, and more particularly to a device of this type which is adapted to be quickly and easily attached and detached from an ordinary family automobile within a few minutes. Various types of luggage or other article carrier racks have been heretofore provided for attachment to the rear end of an automobile, and most of these prior art carrier racks have been of the type which were adapted for attachment to the automobile rear bumper. A disadvantage of the rear bumper type carrier racks is that they are not adapted to carry large weights in a safe manner since the entire weight is carried by the rear bumper. Heretofore other types of luggage carriers have been made which were adapted to be attached to the automobile frame but wherein much time was required to attach these last-mentioned racks and it was necessary to crawl underneath the car for attaching the same. Accordingly, it is the primary object of the present invention to provide a carrier device which is capable of moving many articles, such as stoves, refrigerators, televisions, camping equipment and the like, and which is adapted to be quickly attached and detached within a few minutes and without the individual having to crawl underneath the automobile for attaching the same to the automobile frame.

It is another object of the present invention to provide a carrier device which is adapted for a plurality of purposes including the use of the same as a dump box which may be used to haul dirt, soil and the like which can be dumped from the box in a safe manner.

It is a further object of the present invention to provide a multiple purpose carrier and dump box device which is adapted to be connected to the rear end of the car in a safe and solid manner including a means for connecting the same directly to the frame of the automobile in a quick and safe manner whereby the carrier is safely locked in place and cannot move in any direction.

It is still another object of the present invention to provide a multipurpose carrier and dump box which is simple and compact in construction, economical of manufacture, light in weight, and which may be quickly and easily attached to a car or detached therefrom without altering the car.

It is a still further object of the present invention to provide a multipurpose carrier and dump box of the class described which is adapted to be attached to all conventional family automobiles and which is constructed to permit the trunk lid of the automobile to be opened and closed without interfering with the same.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a perspective view of a multi-purpose carrier made in accordance with the principles of the invention, and showing the carrier mounted on the frame and bumper of an automobile with a dump box receptacle incorporated therein;

FIG. 2 is a side elevational view of the structure illustrated in FIG. 1, and showing the dump box in a dumping position;

FIG. 3 is an enlarged fragmentary elevational view of the structure illustrated in FIG. 2, taken along the line 3—3 thereof and looking in the direction of the arrows;

FIG. 4 is an enlarged fragmentary elevational sectional view of the structure illustrated in FIG. 1, taken along the line 4—4 thereof and looking in the direction of the arrows;

FIG. 5 is an enlarged fragmentary elevational sectional view of the structure illustrated in FIG. 2, taken along the line 5—5 thereof and looking in the direction of the arrows;

FIG. 6 is a fragmentary elevational front perspective view of the structure illustrated in FIG. 1;

FIG. 7 is an enlarged fragmentary view of the structure illustrated in FIG. 4, and taken within the circle marked "7";

FIG. 8 is a fragmentary enlarged view of the structure illustrated in FIG. 5, taken within the circle marked "8";

FIG. 9 is a side elevational view of a modified structure which is adapted for use on automobiles which have a rear portion of the body extending downwardly below the bumper whereby the carrier device must be extended down and around and back up to meet the automobile cross frame;

FIG. 10 is a perspective view of the bottom of a modified multi-purpose carrier box;

FIG. 11 is a fragmentary enlarged view of a further modified carrier device provided with a bumper adjuster means; and, FIG. 12 is an enlarged fragmentary perspective view of still another modification of the invention.

Referring now to the drawings, the reference numeral 10 generally indicates a receptacle comprising a box-like structure in which are disposed the articles to be carried. The article receptacle 10 is operatively supported from the automobile cross frame and rear bumper by means of the pair of carrier brackets generally indicated by the numerals 11 and 12. The dump box or receptacle 10 is preferably made from an aluminum material and comprises the bottom wall 13, the side walls 14 and 15, the front vertical wall 16 and the rear end wall 17. The aforementioned walls 13 through 16 are fixedly connected together by any suitable means. As shown in FIGS. 4 and 5, the upper edges of these walls are rolled outwardly to form a smooth rounded upper edge. The box 10 further includes the angle iron base frame which is fixedly mounted to the lower or bottom wall 13 and which comprises the two side angles 18 and 19, the front and rear transverse angles 20 and 21, and the intermediate transverse angle 22. As shown in FIGS. 1 and 2, the rear wall 17 of the receptacle 10 comprises a gate which is hingedly mounted by any suitable means, as by means of the hinges 23 and 24, to the rear transverse angle bar 21. The receptacle 10 may be provided with suitable red reflecting means as indicated by the numerals 25. The gate 17 may be releasably secured to the side walls 14 and 15 by any suitable means, as by the releasable hook means generally indicated by the numeral 26 in FIG. 1.

In FIGS. 1, 2 and 6, the cross or transverse member of the automobile frame which is normally disposed to the rear end of an automobile adjacent the bumper is indicated by the numeral 27. The rear end of the bumper is indicated by the numeral 28. The frame cross members 27 and the bumpers 28 are indicated by dotted lines. Since the two angle carrier brackets 11 and 12 are constructed similarly, only one will be described in detail and the corresponding parts of the other bracket will be marked with similar reference numerals followed by the small letter "a."

As best seen in FIGS. 1, 2 and 6, the angle bracket 11 comprises the horizontal angle iron 29 on the top side near the front end thereof on which is mounted the block member 30 which is fixedly secured in place, but adapted to be adjusted on the angle 29 by the following described structure. A vertically disposed adjusting screw 31 is threadably mounted through the block 30 and through the upper wall of the angle iron 29 and is adapted to be releasably secured in any suitable adjusted positioned by means of the lock nuts 32 and 33. Fixedly secured, as by welding, to the top end of the adjusting screw 31 is the C-shaped universal snap-on lock clip 34 which is adapted to face forwardly and slip over the lower flange of the automobile frame 27. It will be seen that the auto frame clamping means is adjusted in any position vertically for elevation and can be adjusted forwardly and backwardly by means of the additional holes 35 formed in the upper side of the angle iron 29. The adjustability of the frame snap-on lock clip means permits the angle bracket to be positioned for quick and easy installation on any car. The aforementioned clamp means also prevents the load from shifting in any direction and also prevents the carrier device from bouncing vertically against the car frame when the carrier is empty.

The bumper clamp means comprises the vertically extended strap member 36 which has the upper end thereof 37 curved forwardly and downwardly so as to be positioned over the rear bumper 28. Fixedly mounted on the lower end of the strap member 36, by any suitable means, is an adjusting screw 37 which is adapted to pass through suitable holes as 38 formed on the upper side of the bracket angle iron 29. The vertical bumper clamp strap 36 is provided with an enlarged portion 39 which is formed at the upper end of the adjusting screw 37 and which abuts the top wall of the angle iron 29. The lock nut is fastened on the bolt 38 for fixedly securing the bumper clamp in position. The bumper clamp may be adjusted forwardly and backwardly to suit any car by merely positioning the same in one of the desired holes 38.

As shown in FIG. 2, the carrier frame is further provided with an L-shaped bracket 41 which is adapted to abut the front side of the bumper 28 whereby the bumper 28 is fixedly secured between the bracket 41 and the bumper clamp. The bumper clamp 41 may be termed a bumper lock and is adapted to securely lock the carrier in position and prevent it from moving in a forward or backward direction. The bumper lock 41 is adapted to be fixedly secured in place by any suitable means, as by means of the bolt 42 and nut 43, which may be positioned in various positions by means of the plurality of holes 44 formed in the bracket 29.

Fixedly secured to the rear end of the angle bar 29 on the upper side thereof is the vertical angle bar 45. As shown in FIG. 5, the one side of the bracket 45 is cut away to permit the other side 47 to extend upwardly adjacent the side of the side angle 18. The box angle 18 may be releasably secured to the angle 45 by any suitable means, as by means of the bolt 48 which is adapted to pass through suitable holes on the bracket portion 47 and the angle box bracket 18 and be threadably engaged with the nut 49 welded to the inside of the angle 19.

Fixedly secured to the rear end of the angle bar 29 is the rearwardly and upwardly extended angle bar 50. The lower end of the angle bar 50 is fixedly secured by means of the bolt 51 and nut 52 to the angle iron 29. The lower end of one side of the angle bracket 50 is cut away as indicated by the numeral 53 to permit the other side 54 to overlap the side of the angle 29 and be secured thereto. It will be seen that the lower edge 53 abuts the rear edge of the angle bracket 29 to prevent it from pivoting downwardly from the position shown in FIG. 2. As shown in FIG. 2, the angle bracket 50 extends upwardly and rearwardly at an angle of approximately 30 degrees. As shown in FIGS. 4 and 7, the upper end of the angle bracket 50 is adapted to be hingedly mounted to the side receptacle angle bar 18 by means of the bolt 55, the washer 56 and nut 57 which is welded to the angle bar 18. The bolt 55 passes through the suitable holes formed in the upper end of the bracket 50 and the bracket 18 as indicated by the numerals 58 and 59, respectively. As shown in FIG. 2, the angle bar 18 may be provided with a plurality of holes 59 to adjust the position of the box 10 as desired. If the bracket 50 is secured to the rearward hole as shown in FIG. 2, the load in the box 10 will be quickly and easily dumped when the bolts 48 are removed from the brackets 45 because the box 10 is constructed to provide an optimum balance to the carrier structure when it is loaded. It will be seen that by putting the bolt 55 through the first hole from the front of the box, the center of gravity of the load will be shifted to the rear and the box will tip backwardly in an easier manner than when the other holes 59 are employed. FIG. 2 shows the box 10 in a dumping position in the solid lines and in the load carrying position in the dotted lines.

The bracket 12 comprises the same identical structure as the bracket 11 and similar reference numerals followed by the small letter "a" have been applied thereto as previously mentioned.

It will be seen that the aforedescribed multi-purpose carrier may be quickly and easily attached to an auto frame by first separately attaching the carrier frames 11 and 12 separately to the auto and then attaching the receptacle 10 thereto. The brackets are first mounted in the desired spaced apart condition on the automobile and are secured in place by locking the nuts 32 and 33 and 40 in position so as to clamp the brackets 11 and 12 on the auto cross frame 27 and the bumper 28. The box 10 may then be secured to the angle brackets 11 and 12. It will be obvious that the two brackets 11 and 12 and the box 10 may be assembled as a unit before mounting on an automobile and then be mounted on the automobile as a unit. The last mentioned procedure would be followed in the case where the user is familiar with the procedure of mounting the luggage carrier on his automobile.

FIGURE 9 shows a second embodiment of the invention and the parts which are similar to the parts of the first embodiment are marked with corresponding reference numbers followed by the smaller letter "b." This embodiment may be used on cars where the body continues downwardly beyond the bottom of the bumper. In this embodiment, the block 30b is shown as formed to a longer dimension to give supporting strength to the longer bolt 31b whereby the angle 29b may be disposed downwardly an additional distance to clear the portion of the automobile body which extends downwardly below the bottom of the bumper 28b.

In this second embodiment the vertical supporting angle bar 45b is fixedly mounted on a horizontally disposed tubular member 60 which is parallel to the angle bar 29b but at a position spaced upwardly from the same. The horizontal tubular frame member 60 is fixedly mounted in place on the frame angle bar 29b by means of the vertically disposed interconnecting tubular post 61 which is fixedly connected between the member 60 and 29b by any suitable means, as by welding. The rear ends of the frame member 60 and 29b are further interconnected by the lower end of the angle bar frame member 50b.

The lower end of the angle bar 50b is connected to the angle frame member 29b by means of the bolt 51b and nut 52b. The angle bar 50b is connected to the rear end of the horizontal tubular frame member 60 by means of the bolt 62 and nut 63. The upper end of the angle bar 60b is connected to the receptacle angle 18b by bolt 55b and corresponding structure to that shown in FIG. 7 for connecting the angle member 50 to the receptacle angle member 18. The upper end of the vertical frame member 35b is connected in a similar manner as the corresponding member is connected in the embodiment of FIG. 1 to the receptacle 10. The angle frame member 50b may be connected to the different positions on angle 18b of the receptacle 10b by means of the additional holes 59b in the bracket 18b and the holes 64 and 65 in the frame member 60 and 50b respectively.

It will be understood that FIG. 9 merely shows one of the side frames for this embodiment and that the other side frames would be constructed similarly. It will also be understood that the receptacle 10b may be pivoted as indicated by the arrows in FIG. 9 for dumping purposes in the same manner as the receptacle 10 of FIG. 1. The disposing of the clamp members 34b and 36b at a position spaced upwardly from the frame angle member 29b permits the device to be mounted on the rear end of a car which is provided with a body portion that extends downwardly below the bumper 28b whereby said body portion would be disposed between the clamping means 34b and 36b. The carrier device of FIG. 9 would be mounted on an automobile in the same manner as previously described for the embodiment of FIG. 1.

FIG. 10 is a perspective view of the bottom of a modified multi-purpose receptacle 10c which may be employed on either of the bracket structures shown in FIGS. 1 and 9, namely the brackets 11 and 12, or 11b. In this embodiment the parts of the receptacle which are identical or correspond to the parts of the receptacle of FIG. 1 are marked with corresponding reference numerals followed by the small letter "c." In this embodiment, the transverse receptacle frame structure comprises the three transverse tubular members 20c, 21c and 22c. The last mentioned transverse tubular members are fixedly secured to the bottom wall 13c of the receptacle 10c by any suitable means as by welding. The longitudinally disposed side angle members 18c and 19c are releasably secured to the transverse tubular members 30c, 21c and 22c by means of the bolts 66, 67 and 68. The tubular transverse members 20c, 21c and 22c are provided with suitable spaced apart holes as 69, 70, and 71 whereby the angles 18c and 19c may be adjusted sidewardly to permit the carrier to be used on many different cars whereby the brackets 11 and 12 which are secured to the angle bars 18c and 19c in the manner as shown in FIG. 1 may be adjusted sidewardly to permit the carrier to be mounted on cars wherein the transverse frame member 27 may be accessible in different positions. Furthermore, there may be various obstructions or structural members on the back end of a car which make it necesary to adjust one or both of the carrier brackets 11 and 12 sidewardly, inwardly or outwardly as desired.

FIG. 11 is a fragmentary enlarged perspective view of a further modified carrier device of the present invention provided with a bumper adjuster means for use on the main brackets 29, 29a and 29b of the embodiments of FIGS. 1 and 9. This adjuster member is provided because of the difference in elevation between the bumper and undercarriage of some cars. This bumper adjuster would replace the bumper lock 41. The bumper adjuster comprises the vertically adjustable screw 72 which is adapted to be adjustably secured in the hole passing through the upper side of the main carrier angle bar 29 by means of the lock nuts 73 and 74. Fixedly connected to the upper end of the screw 73 is a generally U-shaped bracket member 75 which is adapted to engage the under side of the bumper. If the bumper engaging member 75 is adjusted upwardly over a few inches distance from the carrier bracket member 29, a shim or spacer similar to the spacer 30 will be used on the screw 72 for rigidity purposes.

FIG. 12 is an enlarged fragmentary perspective view of still another modification of the invention and showing a modified universal snap-on lock clamp. This modified snap-on lock clamp or clip could be carried on the front end of a carrier bracket 29 in the same manner as the snap-on lock clip 34. The corresponding structural parts are marked with reference numerals similar to the embodiment of FIG. 1. As shown in FIG. 12, the difference between the snap-on lock clip of this embodiment and that of FIG. 11 resides in the upper end thereof. Instead of the C-shaped structure 34 of FIG. 1, a similarly functioning structure is employed which comprises the square plate 76 that is fixedly attached to the upper end of the adjusting screw 31f. Fixedly mounted and extending upwardly and sidewardly, outwardly from the plate 76 is a rod 77 which is spaced from the plate 76. As shown in FIG. 12 the snap-on lock clip is adapted to be quickly and easily mounted onto an auto transverse rear frame member 79 by inserting a rod 77 through a hole 78 as formed in the lower end of the tubular auto frame member 79. The screw 31 may be adjusted upwardly and downwardly by means of the lock nuts 32f and 33f.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. As for example, the angle bar 50 may be attached to the angle bar 29 at a 30° angle to the horizontal by means of welding instead of the bolt 51 and nut 52.

What I claim is:

1. An article carrier for attachment to the rear end of an automobile provided with a rear transverse frame member and a rear bumper comprising: a pair of laterally spaced apart carrier frame members; a snap-on clip means adjustably mounted on the front ends of each of said carrier frame members for attaching the frame members to said automobile rear transverse frame member; a clamp means adjustably mounted on each of said carrier frame members for detachably connecting said carrier frame members to said automobile rear bumper; an article receptacle; means for mounting said article receptacle on said carrier frame members; said article receptacle being pivotally mounted on said carrier frame members for pivoting from a locked loading position to an unlocked unloading position; said means for mounting said article receptacle on said carrier frame members including a pair of vertically disposed members having the lower ends thereof fixedly mounted on said pair of carrier frame members, a pair of rearwardly and upwardly sloping members having the lower ends thereof affixed to said pair of carrier frame members; and, said article receptacle being detachably connected to the upper ends of said vertically disposed members and pivotally connected to the upper ends of said upwardly sloping members.

2. The article carrier as defined in claim 1, wherein: said article receptacle includes a base frame having integrally connected transverse and longitudinal members with said means for mounting said article receptacle on said carrier being longitudinally adjustably connected to the longitudinal members.

3. The article carrier as defined in claim 1, wherein: said article receptacle includes a base frame having a plurality of transverse members with a pair of longitudinally adjustable longitudinal members connected to said transverse members and with said means for mounting said article receptacle on said carrier being connected to the longitudinal members.

4. The article carrier as defined in claim 1, wherein: said rear bumper clamp means includes a vertically and longitudinally adjustable first part connected to the carrier frame member at one end thereof with the other end thereof being adapted to engage the upper edge of the bumper and clamp the bumper to the carrier frame member, and, a longitudinally adjustable second part connected to the carrier frame member and being adapted to engage the front side of the bumper to coact with the first part to secure the carrier frame member against longitudinal movement relative to the automobile.

5. The article carrier as defined in claim 1, wherein: said rear bumper clamp means includes a longitudinally adjustable first part connected to the carrier frame member at one end thereof with the other end thereof being adapted to engage the upper edge of the bumper and clamp the bumper to the carrier frame member, and, a vertically adjustable second part connected to the carrier frame member and being adapted to engage the lower edge of the bumper to coact with the first part to secure the carrier frame member against longitudinal movement relative to the automobile.

References Cited in the file of this patent
UNITED STATES PATENTS

| | | |
|---|---|---|
| 1,976,146 | Self | Oct. 9, 1934 |
| 2,560,570 | Harig | July 17, 1951 |